United States Patent
Chen et al.

(10) Patent No.: US 11,211,635 B2
(45) Date of Patent: Dec. 28, 2021

(54) BATTERY, BATTERY PACK, AND UNINTERRUPTIBLE POWER SUPPLY

(71) Applicants: Positec Power Tools (Suzhou) Co., Ltd., Suzhou (CN); Pu Chen, Waterloo (CA)

(72) Inventors: Pu Chen, Waterloo (CA); The Nam Long Doan, Waterloo (CA); Xiaosong Luo, Suzhou (CN)

(*) Notice: Subject to any disclaimer, the term of this patent is extended or adjusted under 35 U.S.C. 154(b) by 0 days.

(21) Appl. No.: 16/680,286

(22) Filed: Nov. 11, 2019

(65) Prior Publication Data

US 2020/0083556 A1 Mar. 12, 2020

Related U.S. Application Data

(63) Continuation of application No. 15/556,277, filed as application No. PCT/CN2016/075706 on Mar. 4, 2016, now Pat. No. 10,522,869.

(30) Foreign Application Priority Data

Mar. 6, 2015 (CN) .......................... 201510100127.5

(51) Int. Cl.
*H01M 10/052* (2010.01)
*H01M 10/36* (2010.01)
(Continued)

(52) U.S. Cl.
CPC ......... *H01M 10/052* (2013.01); *H01M 4/366* (2013.01); *H01M 4/38* (2013.01);
(Continued)

(58) Field of Classification Search
None
See application file for complete search history.

(56) References Cited

U.S. PATENT DOCUMENTS

| | | | |
|---|---|---|---|
| 5,582,935 A | * | 12/1996 | Dasgupta ............... H01M 4/02 429/218.1 |
| 7,244,531 B2 | | 7/2007 | Kim et al. |

(Continued)

FOREIGN PATENT DOCUMENTS

| | | |
|---|---|---|
| CN | 1501539 A | 6/2004 |
| CN | 1744352 A | 3/2006 |

(Continued)

OTHER PUBLICATIONS

Kaiser, Kenneth L. Electromagnetic Compatibility Handbook (p. 24-26) (Year: 2005).*

(Continued)

*Primary Examiner* — Carmen V Lyles-Irving
(74) *Attorney, Agent, or Firm* — Fulwider Patton LLP

(57) ABSTRACT

A battery, including a cathode, an anode, and an electrolyte solution. The cathode includes a cathode active substance and a cathode current collector. The electrolyte solution includes first metal ions and second metal ions. In a charging/discharging process, the first metal ions can be reversibly deintercalated-intercalated at the cathode, the second metal ions can be reduced and deposited as a second metal at the anode, and the second metal can be oxidized and dissolved back to the second metal ions. The anode includes a anode active substance and a anode current collector. A lead-containing substance is provided on a surface of the anode active substance and/or in the electrolyte solution. A mass ratio of lead in the lead-containing substance to the battery is not greater than 1000 ppm.

3 Claims, 2 Drawing Sheets

(51) Int. Cl.
  *H01M 4/42* (2006.01)
  *H01M 4/38* (2006.01)
  *H01M 4/36* (2006.01)
  *H01M 10/20* (2006.01)
  *H01M 4/505* (2010.01)
  *H01M 50/20* (2021.01)
  *H01M 10/04* (2006.01)
  *H02J 7/00* (2006.01)

(52) U.S. Cl.
  CPC ............ *H01M 4/42* (2013.01); *H01M 4/505* (2013.01); *H01M 10/045* (2013.01); *H01M 10/20* (2013.01); *H01M 10/36* (2013.01); *H01M 50/20* (2021.01); *H02J 7/0013* (2013.01); *H01M 2300/0002* (2013.01)

(56) References Cited

U.S. PATENT DOCUMENTS

| | | | |
|---|---|---|---|
| 2007/0128464 A1* | 6/2007 | Jang | B32B 27/36 428/688 |
| 2013/0230774 A1* | 9/2013 | Ortega | H01M 4/38 429/221 |
| 2014/0212712 A1* | 7/2014 | Ito | H01M 4/661 429/72 |
| 2015/0364789 A1* | 12/2015 | Ogawa | H01M 4/134 429/314 |
| 2018/0048016 A1 | 2/2018 | Chen et al. | |

FOREIGN PATENT DOCUMENTS

| | | |
|---|---|---|
| CN | 101373829 A | 2/2009 |
| CN | 101877407 A | 11/2010 |
| CN | 102110839 A | 6/2011 |
| CN | 103094627 A | 5/2013 |
| CN | 105990582 A | 10/2016 |
| EP | 1043793 A2 | 10/2000 |
| EP | 3016199 A1 | 5/2016 |
| EP | 3267518 A1 | 10/2018 |
| WO | 2014206352 A1 | 12/2014 |
| WO | 2016141861 A1 | 9/2016 |

OTHER PUBLICATIONS

Chen (CN 103094627) (a raw machine translation) (Abtract) (May 8, 2013) (Year: 2005).*
Chen (CN 103094627) (a raw machine translation) (Detailed Description) (May 8, 2013) (Year: 2013).*
SIPO, International Search Report and Written Opinion in PCT/CN2016/075706, dated May 6, 2016.
Kaiser, Kenneth L. Electromagnetic Compatibility Handbook (2005)(p. 24-46)(Year:2005).
Kaiser, Kenneth L. Electromagnetic Compatibility Handbook (publication information)(Year: 2005).
EP Exam Report for the EP Application No. 16 761 088.0, dated Sep. 25, 2019, 6 pages.

* cited by examiner

BATTERY, BATTERY PACK, AND UNINTERRUPTIBLE POWER SUPPLY

CROSS-REFERENCES TO RELATED APPLICATIONS

This is a continuation of U.S. patent application Ser. No. 15/556,277, filed on Sep. 6, 2017, which claims priority to application in the U.S. national phase of PCT International Application No. PCT/CN2016/075706 filed Mar. 4, 2016, which claims the benefit of China Patent Application No. 201510100127.5, filed Mar. 6, 2015, which are incorporated by reference in their entirety.

TECHNICAL FIELD

The present invention relates to the battery field, and specifically, to a battery.

The present invention further relates to a battery pack, and the battery pack includes several batteries.

The present invention further relates to an uninterruptible power supply.

RELATED ART

Since its advent over a century ago, the lead-acid battery has become a mature battery technology and occupies absolute market shares in the energy storage fields of automobile starting batteries, electric bicycles, and UPS. Although the lead-acid battery has a short cycle life and low energy density, it has the advantages of low costs and a low price performance ratio. Therefore, in recent years, the NiMH battery, the lithium-ion battery, the sodium-sulfur battery, the flow battery, or the like cannot replace the lead-acid battery in the energy storage field.

In recent years, a novel aqueous secondary battery appears. A reversible intercalation/deintercalation reaction can occur at a cathode of the aqueous secondary battery based on first metal ions, and a reversible reduction depositive and oxidative dissolution reaction can occur at a anode based on second metal ions. An electrolyte solution includes the first metal ions that participate in the intercalation/deintercalation reaction at the cathode and the second metal ions that participate in the deposition-dissolution reaction at the anode. This type of battery uses an aqueous solution as the electrolyte solution, does not have a similar potential safety risk brought by an organic electrolyte solution in the lithium-ion battery, is environmentally friendly and low in cost, and has a high energy density. Therefore, this type of battery has great application value and is expected to replace the lead-acid battery to be a next generation energy storage battery.

The second metal ions in this type of battery may be zinc ions. In this case, a anode active substance is metallic zinc. However, such a anode active substance, when charged or discharged in an aqueous solution, has a dendrite problem. As a result, the cycle performance and the charge/discharge capacity of the battery are affected. Therefore, the prior art needs to be further improved.

SUMMARY

To resolve the technical problem of the present invention, an objective of the present invention is to provide a battery, so as to inhibit dendrite growth at the anode, effectively improve the cycle life of the battery, and improve the electrochemical performance of the battery.

To achieve the foregoing objective, the present invention uses the following technical solution: a battery, including a cathode, a anode, and an electrolyte solution, where the cathode includes a cathode active substance and a cathode current collector; the electrolyte solution includes first metal ions and second metal ions; in a charging/discharging process, the first metal ions can be reversibly deintercalated-intercalated at the cathode, the second metal ions can be reduced and deposited as a second metal at the anode, and the second metal can be oxidized and dissolved back to the second metal ions; the anode includes a anode active substance and a anode current collector; a lead-containing substance is provided on a surface of the anode active substance and/or in the electrolyte solution; and a mass ratio of lead in the lead-containing substance to the battery is not greater than 1000 ppm.

Preferably, the lead-containing substance on the surface of the anode active substance includes a lead metal.

Preferably, the lead-containing substance in the electrolyte solution includes lead ions.

Preferably, a mass ratio of lead in the lead-containing substance in the electrolyte solution to the electrolyte solution is not less than 10 ppm.

Preferably, the lead-containing substance includes at least one of metallic lead, lead sulfate, or lead oxide.

Preferably, the battery includes an additive of a bismuth compound, and the bismuth compound is added to the anode and/or the electrolyte solution.

Preferably, the bismuth compound is selected from bismuth trioxide and/or bismuth nitrate.

Preferably, the bismuth compound accounts for 0.01-5% of the total weight of the electrolyte solution.

Preferably, the bismuth compound accounts for 0.1-10% of the total weight of the anode.

Preferably, the anode active substance includes zinc.

Preferably, the anode current collector includes brass foil.

Preferably, the cathode current collector includes a nylon mesh carrier and graphite foil that is coated on the nylon mesh carrier.

Preferably, the first metal ions include lithium ions, sodium ions, or magnesium ions.

Preferably, the second metal ions include zinc ions.

Preferably, the electrolyte solution is an aqueous electrolyte solution.

Preferably, the cathode active substance includes a modified lithium manganese oxide material, and the modified lithium manganese oxide material meets a general formula $Li_{1+x}Mn_yM_zO_k$, where M is selected from Pb, $-1 \leq x \leq 0.5$, $1 \leq y \leq 2.5$, $0 < z \leq 0.1$, and $3 \leq k \leq 6$.

Preferably, a surface of the modified lithium manganese oxide material is further coated with metallic lead and/or lead oxide.

Preferably, a surface of the cathode active substance is provided with a coating layer, and the coating layer is metallic lead and/or lead oxide.

Preferably, a mass percentage of lead in the metallic lead and/or the lead oxide in the cathode active substance is in the range of 0.001%-10%.

The present invention further provides a battery pack, including several batteries described above.

The present invention further provides an uninterruptible power supply, including the battery described above.

Compared with the prior art, the beneficial effect of the present invention is: Dendrite growth on the anode active substance is inhibited by adding the lead-containing substance to the surface of the anode active substance and/or the electrolyte solution, so as to prolong the cycle life of the battery, and improve the electrochemical performance and safety performance of the battery.

To resolve the technical problem of the present invention, an objective of the present invention is to provide a modified lithium manganese oxide material. With good chemical stability and a high capacity, the material can work well with an aqueous electrolyte solution to reduce a reaction rate of a side reaction, so as to improve the electrochemical performance of the material.

To achieve the foregoing objective, the present invention uses the following technical solution: a modified lithium manganese oxide material, the modified lithium manganese oxide material meeting a general formula $Li_{1+x}Mn_yM_zO_k$, where M is selected from Pb, $-1 \leq x \leq 0.5$, $1 \leq y \leq 2.5$, $0 < z \leq 0.1$, and $3 \leq k \leq 6$.

Preferably, the modified lithium manganese oxide material has a spinel structure.

Preferably, the modified lithium manganese oxide material has a medium diameter in the range of 5-20 μm, and the modified lithium manganese oxide material has a specific surface area in the range of 0.1-1.0 $m^2/g$.

Preferably, a surface of the modified lithium manganese oxide material is further coated with metallic lead and/or lead oxide.

Preferably, a mass percentage of lead in the metallic lead and/or the lead oxide in the modified lithium manganese oxide material is in the range of 0.001%-10%.

Preferably, the mass percentage of the lead in the metallic lead and/or the lead oxide in the modified lithium manganese oxide material is in the range of 0.1%-5%.

The present invention further provides a battery that can effectively inhibit a rate of a side reaction at the cathode, so as to further resolve the self-discharge problem of the battery.

To resolve the foregoing technical problem, the technical solution provided in the present invention is: a battery, including a cathode, a anode, and an electrolyte solution, where the cathode includes a cathode active substance and a cathode current collector, the electrolyte solution is an aqueous solution, and the cathode active substance includes the modified lithium manganese oxide material described above.

Preferably, the electrolyte solution includes first metal ions and second metal ions; in a charging/discharging process, the first metal ions can be reversibly deintercalated-intercalated at the cathode, the second metal ions can be reduced and deposited as a second metal at the anode, and the second metal can be oxidized and dissolved back to the second metal ions; and the first metal ions are lithium ions.

Preferably, the second metal ions are zinc ions.

Preferably, the anode includes a anode active substance and a anode current collector, a lead-containing substance is provided on a surface of the anode active substance and/or in the electrolyte solution, and a mass ratio of lead in the lead-containing substance to the battery is not greater than 1000 ppm.

Preferably, the pH of the electrolyte solution is in the range of 2-8.

The present invention further provides a battery pack, including several batteries described above.

The present invention further provides a method for preparing the modified lithium manganese oxide material that is described above, including the following steps:

mixing a lithium source, a manganese source, and a lead source according to a given proportion, and performing heat treatment on the mixed product for 15-30 hours at a temperature of 700-850° C.

Compared with the prior art, the beneficial effect of the present invention is: A lithium manganese oxide doped with lead is modified to enable the modified material to have good stability in an aqueous electrolyte solution, so as to inhibit occurrence of a side reaction at an interface between the material and the electrolyte solution. Therefore, the modified lithium manganese oxide material has excellent capacity and cycle performance. For such a battery that uses the modified lithium manganese oxide, the self-discharge is reduced, and the float charging performance and the cycle performance are obviously improved.

To resolve the technical problem of the present invention, an objective of the present invention is to provide a composite cathode material. With good chemical stability and a high capacity, the material can work well with an aqueous electrolyte solution to reduce a reaction rate of a side reaction, so as to improve the electrochemical performance of the material.

To achieve the foregoing objective, the present invention uses the following technical solution: a composite cathode material, where the composite cathode material includes a cathode active substance and a coating layer, the cathode active substance includes a lithium ion intercalation/deintercalation compound, and the coating layer is at least one of metallic lead, lead monoxide, or lead tetroxide.

Preferably, the lithium ion intercalation/deintercalation compound includes at least one of lithium cobalt oxide, lithium nickel oxide, or lithium manganese oxide.

Preferably, the composite cathode material has a medium diameter in the range of 5-20 μm, and the composite cathode material has a specific surface area in the range of 0.1-1.0 $m^2/g$.

Preferably, a mass percentage of lead in the metallic lead, the lead monoxide, or the lead tetroxide in the cathode active substance is in the range of 0.001%-10%.

Preferably, the mass percentage of the lead in the metallic lead, the lead monoxide, or the lead tetroxide in the cathode active substance is in the range of 0.1%-5%.

The present invention further provides a battery that can effectively inhibit a rate of a side reaction at the cathode, so as to further resolve the self-discharge problem of the battery.

To resolve the foregoing technical problem, the technical solution provided in the present invention is: a battery, including a cathode, a anode, and an electrolyte solution, where the cathode includes a composite cathode material and a cathode current collector, the electrolyte solution is an aqueous solution, the composite cathode material includes a cathode active substance and a coating layer, the cathode active substance includes a lithium ion intercalation/deintercalation compound, and the coating layer is metallic lead and/or lead oxide.

Preferably, the electrolyte solution includes first metal ions and second metal ions; in a charging/discharging process, the first metal ions can be reversibly deintercalated-intercalated at the cathode, the second metal ions can be reduced and deposited as a second metal at the anode, and the second metal can be oxidized and dissolved back to the second metal ions; and the first metal ions are lithium ions.

Preferably, the second metal ions are zinc ions.

Preferably, the anode includes a anode active substance and a anode current collector, a lead-containing substance is provided on a surface of the anode active substance and/or in the electrolyte solution, and a mass ratio of lead in the lead-containing substance to the battery is not greater than 1000 ppm.

Preferably, a mass percentage of lead in the metallic lead and/or the lead oxide in the cathode active substance is in the range of 0.001%-10%.

Preferably, the pH of the electrolyte solution is in the range of 2-8.

The present invention further provides a battery pack, including several batteries described above.

Compared with the prior art, the beneficial effect of the present invention is: The lithium ion intercalation/deintercalation compound is coated to enable the obtained composite cathode material to have good stability in an aqueous electrolyte solution, so as to inhibit occurrence of a side reaction at an interface between the material and the electrolyte solution. Therefore, the composite cathode material has excellent capacity and cycle performance. For a battery that uses the composite cathode material, the self-discharge is reduced, and the float charging performance and the cycle performance are obviously improved.

DETAILED DESCRIPTION OF THE PREFERRED EMBODIMENTS

Figure 1:
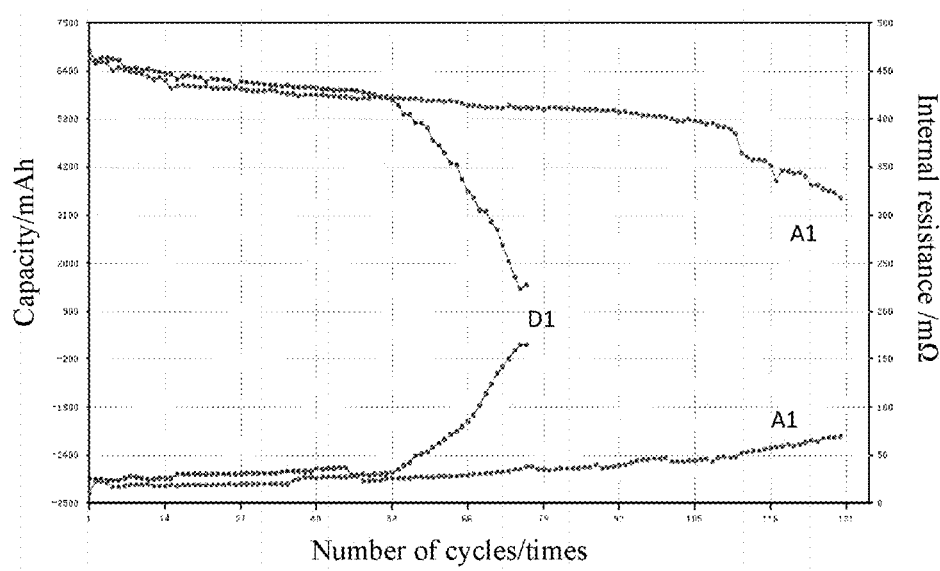
FIG. 1 shows relationship curves of discharge capacities, internal resistance, and numbers of cycles of batteries in Embodiment 1-1 and Comparative example 1-1.

To make the technical problems to be resolved by the present invention, and technical solutions and beneficial effects of the present invention clearer, the present invention is further described in detail with reference to embodiments. It should be understood that the specific embodiments described herein are merely intended to explain the present invention, but are not intended to limit the present invention.

Implementation 1

The present invention discloses a modified lithium manganese oxide material. The modified lithium manganese oxide material meets a general formula $Li_{1+x}Mn_yM_zO_k$, where M is selected from Pb, $-1 \leq x \leq 0.5$, $1 \leq y \leq 2.5$, $0 < z \leq 0.1$, and $3 \leq k \leq 6$.

Preferably, the modified lithium manganese oxide material after being doped with lead still has a spinel structure that is of the material before the doping. Therefore, the modified lithium manganese oxide material has good structural stability.

More preferably, a surface of the modified lithium manganese oxide material doped with lead is further coated with metallic lead and/or lead oxide. For example, the lead oxide includes at least one of lead monoxide, lead dioxide, or lead tetroxide. Coating the modified lithium manganese oxide material by using the metallic lead and/or the lead oxide enables a coating layer to allow lithium ions to pass through freely while isolating the modified lithium manganese oxide material from an aqueous electrolyte solution. In this way, occurrence of a side reaction at an interface between a cathode and the aqueous electrolyte solution is avoided when normal charge/discharge of a battery is ensured, thereby reducing self-discharge at the cathode.

Preferably, a mass percentage of lead in the metallic lead and/or the lead oxide in the modified lithium manganese oxide material is in the range of 0.001%-10%. More preferably, the mass percentage of the lead in the metallic lead and/or the lead oxide in the modified lithium manganese oxide material is in the range of 0.1%-5%. In this way, the modified lithium manganese oxide material can be well protected without affecting the energy density at the cathode.

Preferably, the modified lithium manganese oxide material has a medium diameter D50 of 5-20 μm.

A smaller particle size of the material indicates a smaller tap density and compacted density of the material, and a smaller obtained volumetric energy density of the battery. Moreover, if the particle size is small, the processability of the material is poor, and agglomeration or the like is easy to occur during a slurry preparing process, making it difficult for coating. A larger particle size of the material indicates a longer lithium ion intercalation/deintercalation path in a charging/discharging process. As a result, the electrical conductivity of the material is poor, and the rate performance is not good. Therefore, in the present invention, the medium diameter of the modified lithium manganese oxide material is set to 5-20 μm, to avoid the foregoing problems. For example, the medium diameter D50 may be 5-10 μm, 5-15 μm, 8 μm, 12 μm, 16 μm, or 18 μm.

Preferably, the modified lithium manganese oxide material has a specific surface area of 0.1-1.0 m²/g.

If the specific surface area of the material is excessively large, surface energy of the material is high, agglomeration is easy to occur during slurry preparing, and a contact surface between the material and the electrolyte solution is large. As a result, a side reaction more easily occurs. Therefore, to avoid the foregoing problems and improve the processability of the modified lithium manganese oxide material, the modified lithium manganese oxide material in the present invention has a specific surface area in the range of 0.1-1.0 m²/g.

A specific embodiment of the present invention further provides a method for preparing a modified lithium manganese oxide material. Specifically, the preparing method includes the following steps.

A lithium source, a manganese source, and a lead source are mixed according to a given proportion, and heat treatment is performed on the mixed product for 15-30 hours at a temperature of 700-850° C.

Specifically, the lithium source, the manganese source, and an M source are weighed according to a stoichiometric ratio of the general formula $Li_{1+x}Mn_yM_zO_k$.

In the general formula $Li_{1+x}Mn_yM_zO_k$, M is selected from Pb, $-1 \leq x \leq 0.5$, $1 \leq y \leq 2.5$, $0 < z \leq 0.1$, and $3 \leq k \leq 6$.

The weighed lithium source, manganese source, and lead source are mixed, where the mixing includes wet mixing and dry mixing. In a specific embodiment, the weighed lithium source, manganese source, and lead source are mixed in alcohol, and are stirred evenly after the mixing.

Heat treatment is performed on the evenly stirred product. Specifically, heat treatment is performed in an oxygen containing atmosphere for 15-30 hours, and a condition for the heat treatment is heating to 700-850° C. at a heating speed of 1-10° C./min. Finally, a modified lithium manganese oxide material doped with lead is obtained by naturally cooling to room temperature.

Specifically, the lithium source includes, but is not limited to, lithium carbonate; the manganese source includes, but is not limited to, manganous manganic oxide; and the lead source includes, but is not limited to, lead sulfate and lead oxide.

According to the modified lithium manganese oxide material provided in the present invention, a lithium manganese oxide doped with lead is modified to enable the modified material to have good stability in the aqueous electrolyte solution, so as to inhibit occurrence of a side reaction at an interface between the material and the electrolyte solution. Therefore, the modified lithium manganese oxide material has excellent capacity and cycle performance. For a battery that uses the modified lithium manganese oxide, the self-discharge is reduced, and the float charging performance and the cycle performance are obviously improved.

Implementation 2

The present invention discloses a composite cathode material. The composite cathode material includes a cathode active substance and a coating layer. The cathode active substance includes a lithium ion intercalation/deintercalation compound. The coating layer is at least one of metallic lead, lead monoxide, or lead tetroxide.

A surface of the lithium ion intercalation/deintercalation compound in the cathode active substance is coated with at least one of the lead, the lead monoxide, or the lead tetroxide. Coating the lithium ion intercalation/deintercalation compound by using at least one of the lead, the lead monoxide, or the lead tetroxide enables the coating layer to allow lithium ions to pass through freely while isolating the cathode active substance from an aqueous electrolyte solution. In this way, occurrence of a side reaction at an interface between the cathode active substance and the aqueous electrolyte solution is avoided when normal charge/discharge of a battery is ensured, thereby reducing self-discharge at a cathode.

Specifically, the lithium ion intercalation/deintercalation compound includes at least one of lithium cobalt oxide, lithium nickel oxide, or lithium manganese oxide.

Preferably, a mass percentage of lead in the metallic lead, the lead monoxide, or the lead tetroxide in the cathode active substance is in the range of 0.001%-10%. Specifically, when the coating layer is only a single component, for example, the metallic lead, the lead monoxide, or the lead tetroxide, a mass percentage of lead in the metallic lead, the lead monoxide, or the lead tetroxide in the cathode active substance is in the range of 0.001-10%. When the coating layer is a mixed component, for example, the metallic lead and the lead monoxide, a mass percentage of total lead in the metallic lead and the lead monoxide in the cathode active substance is in the range of 0.001-10%.

More preferably, the mass percentage of the lead in the metallic lead, the lead monoxide, or the lead tetroxide in the cathode active substance is in the range of 0.1%-5%. In this way, the modified lithium manganese oxide material can be well protected without affecting the energy density at the cathode.

Preferably, the composite cathode material has a medium diameter D50 of 5-20 μm.

A smaller particle size of the material indicates a smaller tap density and compacted density of the material, and a smaller obtained volumetric energy density of the battery. Moreover, if the particle size is small, the processability of the material is poor, and agglomeration or the like is easy to occur during a slurry preparing process, making it difficult for coating. A larger particle size of the material indicates a longer lithium ion intercalation/deintercalation path in a charging/discharging process. As a result, the electrical conductivity of the material is poor, and the rate performance is not good. Therefore, in the present invention, the medium diameter of the composite cathode material is set to 5-20 μm, to avoid the foregoing problems. For example, the medium diameter D50 may be 5-10 μm, 5-15 μm, 12 μm, 14 μm, 16 μm, or 18 μm.

Preferably, the composite cathode material has a specific surface area of 0.1-1.0 $m^2/g$.

If the specific surface area of the material is excessively large, surface energy of the material is high, agglomeration is easy to occur during slurry preparing, and a contact surface between the material and the electrolyte solution is large. As a result, a side reaction more easily occurs. Therefore, to avoid the foregoing problems and improve the processability of the composite cathode material, the composite cathode material in the present invention has a specific surface area in the range of 0.1-1.0 $m^2/g$.

A specific embodiment of the present invention further provides a method for preparing a composite cathode material. Specifically, the preparing method includes the following steps.

The lithium ion intercalation/deintercalation compound of the cathode active substance and a lead source are weighed according to a predetermined weight ratio.

The weighed lithium ion intercalation/deintercalation compound and lead source are mixed, and are stirred evenly, so that a coating material, that is, the lead source, is evenly coated on the lithium ion intercalation/deintercalation compound. The mixing includes wet mixing and dry mixing. A solvent used in the wet mixing includes, but is not limited to, alcohol.

The mixed product is sintered. Certainly, before the sintering, the mixed product may be dried. Specifically, a sintering condition is heating to 400-650° C. at a heating speed of 1-10° C./min, and maintaining the temperature for 15-30 hours. Finally, the composite cathode material is obtained by naturally cooling to room temperature.

Specifically, the lead source includes, but is not limited to, lead acetate, lead monoxide, and lead tetroxide.

According to the composite cathode material provided in the present invention, the lithium ion intercalation/deintercalation compound is coated to enable the coated material to have good stability in the aqueous electrolyte solution, so as to inhibit occurrence of a side reaction at an interface between the material and the electrolyte solution. Therefore, the lithium ion intercalation/deintercalation compound has excellent capacity and cycle performance. For a battery that uses the composite cathode material, the self-discharge is reduced, and the float charging performance and the cycle performance are obviously improved.

Implementation 3

The present invention discloses a battery, including a cathode, a anode, and an electrolyte solution. The cathode includes a cathode active substance and a cathode current collector. The electrolyte solution includes first metal ions and second metal ions. In a charging/discharging process, the first metal ions can be reversibly deintercalated-intercalated at the cathode, the second metal ions can be reduced and deposited as a second metal at the anode, and the second metal can be oxidized and dissolved back to the second metal ions. The anode includes a anode active substance and a anode current collector. A lead-containing substance is provided on a surface of the anode active substance and/or in the electrolyte solution. A mass ratio of lead in the lead-containing substance to the battery is not greater than 1000 ppm.

A charging/discharging principle of the battery in the present invention is: when the battery is charged, the cathode active substance deintercalates the first metal ions, and releases electrons when the cathode active substance is oxidized; the electrons reach the anode active substance of the battery through an external circuit; and the second metal ions in the electrolyte solution are reduced on the anode active substance after obtaining the electrons and are deposited on the anode active substance. When the battery is discharged, the second metal on the anode active substance is oxidized, loses electrons, and is converted into the second metal ions to enter the electrolyte solution. The electrons reach the cathode through an external circuit, the cathode active substance receives the electrons and is reduced, and the first metal ions are intercalated into the cathode active substance.

The cathode of the battery includes the cathode active substance. The cathode active substance participates in a reaction at the cathode, and can reversibly deintercalate-intercalate the first metal ions.

The cathode active substance is variously selected.

Selection 1

The cathode active substance may be a compound with a spinel structure that meets a general formula $Li_{1+x}Mn_yM_zO_k$ and that can reversibly deintercalate-intercalate lithium ions, where $-1 \leq x \leq 0.5$, $1 \leq y \leq 2.5$, $0 < z \leq 0.5$, $3 \leq k \leq 6$, and M is selected from at least one of Na, Li, Co, Mg, Ti, Cr, V, Zn, Zr, Si, or Al. Preferably, the cathode active substance contains $LiMn_2O_4$.

The cathode active substance may be a compound with a layer structure that meets a general formula $Li_{1+x}M_yM'_zM''_cO_{2+n}$ and that can reversibly deintercalate-intercalate lithium ions, where $-1 < x \leq 0.5$, $0 \leq y \leq 1$, $0 \leq z \leq 1$, $0 \leq c \leq 1$, $-0.2 \leq n \leq 0.2$, and M, M', and M'' are separately selected from at least one of Ni, Mn, Co, Mg, Ti, Cr, V, Zn, Zr, Si, or Al. Preferably, the cathode active substance contains $LiCoO_2$.

The cathode active substance may be a compound with an olivine structure that meets a general formula $Li_xM_{1-y}M'_y(XO_4)_n$ and that can reversibly deintercalate-intercalate lithium ions, where $0 < x \leq 2$, $0 \leq y \leq 0.6$, $1 \leq n \leq 1.5$, M is selected from at least one of Fe, Mn, V, or Co, M' is selected from at least one of Mg, Ti, Cr, V, or Al, and X is selected from at least one of S, P, or Si. Preferably, the cathode active substance contains $LiFePO_4$.

In the current battery industry, modification treatment such as doping or coating may be performed on almost all cathode active substances. However, such modification means as doping and coating result in a complex chemical general formula of a material. For example, $LiMn_2O_4$ cannot represent the general formula of "lithium manganese oxide" that is widely used at the present. Instead, the "lithium manganese oxide" should be subject to the general formula $Li_{1+x}Mn_yM_zO_k$, widely including a modified lithium manganese oxide cathode active substance that is modified in various manners. Similarly, $LiFePO_4$ and $LiCoO_2$ should also be comprehensively understood as including cathode active substances that are modified in various manners such as doping and coating and that respectively meet general formulas $Li_xM_{1-y}M'_y(XO_4)_n$ and $Li_{1+x}M_yM'_zM''_cO_{2+n}$.

Preferably, when the cathode active substance is a substance that can reversibly deintercalate-intercalate lithium ions, the cathode active substance may be a compound such as $LiMn_2O_4$, $LiFePO_4$, $LiCoO_2$, $LiM_xPO_4$, or $LiM_xSiO_y$ (M is an aliovalent metal).

More preferably, the cathode active substance is $LiMn_2O_4$. Among numerous cathode materials, $LiMn_2O_4$ is considered to be one of the most promising cathode materials because of its advantages of low costs, sufficient raw materials, being environmentally friendly, and good safety performance.

In addition, a compound (for example, $NaVPO_4F$) that can deintercalate-intercalate sodium ions, a compound (for example, $MgM_xO_y$ (where M is a metal, $0.5 < x < 3$, and $2 < y < 6$)) that can deintercalate-intercalate magnesium ions, and a compound that has similar functions and that can deintercalate-intercalate ions or functional groups may all serve as the cathode active substance of the battery in the present invention.

Selection 2

Preferably, the cathode active substance includes a modified lithium manganese oxide material. In this case, the first metal ions are lithium ions.

The modified lithium manganese oxide material meets the general formula $Li_{1+x}Mn_yM_zO_k$, where M is selected from Pb, $-1 \leq x \leq 0.5$, $1 \leq y \leq 2.5$, $0 < z \leq 0.1$, and $3 \leq k \leq 6$. The modified lithium manganese oxide material has been described in detail in Implementation 1, and details are not described herein again.

Selection 3

Preferably, a coating layer is provided on a surface of the cathode active substance. The cathode active substance includes a lithium ion intercalation/deintercalation compound, and the coating layer is metallic lead and/or lead oxide.

Specifically, the lithium ion intercalation/deintercalation compound includes at least one of lithium cobalt oxide, lithium nickel oxide, or lithium manganese oxide.

Preferably, a mass percentage of lead in the metallic lead and/or the lead oxide in the cathode active substance is in the range of 0.001%-10%. More preferably, the mass percentage of the lead in the metallic lead and/or the lead oxide in the cathode active substance is in the range of 0.1%-5%. In this way, the cathode active substance can be well protected without affecting the energy density at the cathode.

For example, the lead oxide includes lead monoxide, lead dioxide, or lead tetroxide.

A medium diameter, a specific surface area, and a preparing method of the cathode active substance with the coating layer provided on the surface are the same as those of the composite cathode material in Implementation 2, and details are not described herein again.

Specifically, when a cathode material is prepared, in addition to the cathode active substance, usually a cathode conductive agent and a cathode adhesive are added to improve performance of the cathode.

The conductive agent can reduce overall resistance at the cathode, and enhance a conductive path between particles of the cathode material. The cathode conductive agent is selected from one or more of a conductive polymer, a conductive oxide, a conductive ceramic, an active carbon, graphene, carbon black, graphite, a carbon fiber, a metal fiber, a metal powder, or a metal flake. Preferably, a mass percentage of the cathode conductive agent in the cathode material is 1%-15%. Further, the cathode conductive agent is the graphite, and the mass percentage of the cathode conductive agent in the cathode material is 10%-14%.

The adhesive facilitates even bonding of the cathode active substance and the conductive agent, so as to form the cathode. The cathode adhesive may be selected from one of polyethylene oxide, polypropylene oxide, polyacrylonitrile, polyimide, polyester, polyether, a fluorinated polymer, polydivinyl polyethylene glycol, polyethylene glycol diacrylate, polyethylene glycol-dimethacrylate, or a mixture or a derivant of any of the foregoing polymers. More preferably, the cathode adhesive is selected from polytetrafluoroethylene (PTFE), polyvinylidene fluoride (PVDF), or styrene-butadiene rubber (SBR).

Specifically, the cathode further includes the cathode current collector that carries the cathode active substance. The cathode current collector only serves as a carrier for conducting and collecting electrons, and does not participate in an electrochemical reaction. That is, within a working voltage range of the battery, the cathode current collector can stably exist in the electrolyte solution and basically does not have a side reaction, so as to ensure that the battery has stable cycle performance.

The material of the cathode current collector is selected from one of a carbon-based material, a metal, or an alloy.

The carbon-based material is selected from one of glassy carbon, graphite foil, a graphite flake, carbon foam, carbon felt, a carbon cloth, or a carbon fiber.

Preferably, the cathode current collector includes a carrier and graphite foil coated on the carrier.

In the present invention, the graphite foil is used as the cathode current collector, not only the weight of the cathode is reduced, but also the battery has a longer float charging life because the graphite foil has good stability in an aqueous electrolyte solution. In addition, costs of the battery are reduced, so that the battery has a commercial application prospect.

The carrier is electrochemically inert, and is mainly for carrying the graphite foil, to improve the mechanical property of the graphite foil. The material of the carrier is selected from one of polyethylene terephthalate, polybutylene terephthalate, polyethylene, polypropylene, polyamide, polyurethane, or polyacrylonitrile. These polymer materials may stably exist in the cathode current collector and do not participate in an electrochemical reaction, saving the weight for relatively high energy density output of the battery. Preferably, the carrier is a nylon mesh, that is, polyamide.

The metal includes one of Ni, Al, Fe, Cu, Pb, Ti, Cr, Mo, Co, Ag, or one of the foregoing metals that are passivated.

The alloy includes stainless steel, carbon steel, an Al alloy, a Ni alloy, a Ti alloy, a Cu alloy, a Co alloy, a Ti—Pt alloy, a Pt—Rh alloy, or one of the foregoing metals that are passivated.

The stainless steel includes a stainless steel mesh or stainless steel foil. The model of the stainless steel includes, but is not limited to, stainless steel 304, or stainless steel 316, or stainless steel 316L.

Preferably, a main objective of passivating the cathode current collector is to form a layer of passive oxidation film on a surface of the cathode current collector, so as to stably collect and conduct the electrons in the charging/discharging process of the battery without participating in the reaction of the battery, thereby ensuring stable performance of the battery. Methods for passivating the cathode current collector include chemical passivation or electrochemical passivation.

The chemical passivation includes oxidizing the cathode current collector by using an oxidant, so as to form a passive film on the surface of the cathode current collector. A principle for selecting the oxidant is that the oxidant can enable a passive film to be formed on the surface of the cathode current collector without dissolving the cathode current collector. The oxidant is selected from, but is not limited to, concentrated nitric acid or ceric sulfate $(Ce(SO_4)_2)$.

The electrochemical passivation includes performing electrochemical oxidation on the cathode current collector or charging or discharging the battery containing the cathode current collector, so as to form a passive film on the surface of the cathode current collector.

Preferably, the cathode further includes a composite collector that carries the cathode active substance. The composite collector includes the cathode current collector and a conductive film coated on the cathode current collector.

The conductive film satisfies the requirements of stably existing in the aqueous electrolyte solution, being insoluble in the electrolyte solution, not swelling, being not oxidized under a high voltage, being easily processed to be compact, being waterproof, and being conductive. On one hand, the conductive film can protect the cathode current collector and prevent the aqueous electrolyte solution from corroding the cathode current collector. On the other hand, the conductive film helps reduce internal contact resistance between a cathode sheet and the cathode current collector, and improve energy of the battery. Preferably, the thickness of the conductive film is 10 μm-2 mm.

The cathode current collector has a first surface and a second surface that are disposed opposite to each other. Preferably, both the first surface and the second surface of the cathode current collector are coated with a conductive film.

The conductive film contains a polymer that is a necessary component. The weight percentage of the polymer in the conductive film is 50-95%. Preferably, the polymer is a thermoplastic polymer. To enable the conductive film to be conductive, there are two feasible forms: (1) the polymer is a conductive polymer; and (2) in addition to the polymer, the conductive film further contains a conductive filler.

The material of the conductive polymer is required to be conductive but electrochemically inert, that is, the material is not ionic conductive as a charge transfer medium. Specifically, the conductive polymer includes, but is not limited to, polyacetylene, polypyrrole, polythiophene, polyphenylene sulfide, polyaniline, polyacrylonitrile, polyquinoline, polyparaphenylene, and any mixture thereof. The conductive polymer is conductive, and may further be doped or modified to further improve electrical conductivity thereof. Considering electrical conductivity and stable use in the battery, the conductive polymer is preferably the polyaniline, the polypyrrole, the polythiophene, and the polyacetylene.

Similarly, the material of the conductive filler is required to have a small surface area, be difficult to be oxidized, have a high degree of crystallinity, be conductive but electrochemically inert, that is, the material is not ionic conductive as a charge transfer medium.

The material of the conductive filler includes, but is not limited to, the conductive polymer, the carbon-based material, or a metal oxide. A mass percentage of the conductive filler in the conductive film is in the range of 5-50%. The average particle size of the conductive filler is not particularly defined, and is generally in the range of 100 nm-100 μm.

When the conductive film contains the conductive filler, the polymer in the conductive film preferably contains a non-conductive polymer that bonds the conductive filler. The non-conductive polymer enhances bonding of the conductive filler, and improves reliability of the battery. Preferably, the non-conductive polymer is a thermoplastic polymer.

Specifically, the thermoplastic polymer includes, but is not limited to, one or more of polyolefin such as polyethylene, polypropylene, polybutylene, polyvinyl chloride, polystyrene, polyamide, polycarbonate, polymethylmethacrylate, polyformaldehyde, polyphenyleneoxide, polysulfone, polyethersulfone, styrene-butadiene rubber, or polyvinylidene difluoride. The thermoplastic polymer is preferably the polyolefin, the polyamide, and the polyvinylidene difluoride. These polymers are easy to be melted through heating, and therefore are easy to be compounded with the cathode current collector. In addition, these polymers have large potential windows, so as to enable the cathode to be stable and save the weight for an output density of the battery.

Preferably, the conductive film is bonded onto the cathode current collector by means of hot-press compounding, vacuum pumping, or spray painting.

The electrolyte solution includes an electrolyte and a solvent. A function of the solvent in the electrolyte solution is to dissolve the electrolyte and ionize the electrolyte in the solvent, so as to finally generate cations and anions that can move freely in the electrolyte solution. The electrolyte solution in the present invention is preferably an aqueous electrolyte solution, and the solvent is preferably water.

The first metal ions included in the electrolyte solution can be reversibly deintercalated-intercalated at the cathode during the charging/discharging process. That is, when the battery is charged, the first metal ions are deintercalated from the cathode active substance and enter the electrolyte solution; when the battery is discharged, the first metal ions in the electrolyte solution are intercalated into the cathode active substance.

Preferably, the first metal ions are selected from lithium ions, sodium ions, or magnesium ions. More preferably, the first metal ions are the lithium ions.

Preferably, the electrolyte solution further includes the second metal ions. During the charging process, the second metal ions are reduced and deposited as the second metal at the anode. During the discharging process, the second metal is oxidized and dissolved as the second metal ions. Preferably, the second metal ions are zinc ions.

Preferably, the first metal ions are different from the second metal ions. In a preferred implementation, the electrolyte solution includes lithium ions and zinc ions. During the charging/discharging process, the lithium ions are intercalated/deintercalated at the cathode, and the zinc ions are deposited and dissolved at the anode.

The anions in the electrolyte solution may be any anions that basically do not affect reactions at the cathode and the anode and that are obtained by dissolving the electrolyte in the solvent. For example, the anions may be sulfate ions, chlorine ions, acetate ions, nitrate ions, phosphate ions, formate ions, alkylsulfonate ions, or a mixture thereof.

Concentrations of various ions in the electrolyte solution may be changed and adjusted according to different electrolytes, different solvents, different application fields of the battery, or the like.

Preferably, in the electrolyte solution, the concentration of the first metal ions is 0.1-10 mol/L.

Preferably, in the electrolyte solution, the concentration of the second metal ions is 0.5-15 mol/L.

Preferably, in the electrolyte solution, the concentration of the anions is 0.5-12 mol/L.

To better optimize the battery performance, the pH of the electrolyte solution is in the range of 3-7. The pH range may be adjusted by using a buffer. Excessively high pH of the electrolyte solution may affect the concentration of the zinc ions in the electrolyte solution, and excessively low pH of the electrolyte solution may accelerate corrosion of an electrode material. However, keeping the pH of the electrolyte solution in the range of 3-7 can not only effectively ensure the concentrations of the metal ions in the electrolyte solution but also avoid electrode corrosion.

The anode of the battery includes the anode active substance in which a reversible reductive deposition and oxidative dissolution reaction can occur. When the battery is charged, the second metal ions can be reduced as the second metal at a side of the anode active substance, and be deposited on the anode active substance. When the battery is discharged, the second metal on the anode active substance is oxidized back to the second metal ions to enter the electrolyte solution. Preferably, the second metal ions are zinc ions. In this case, the anode of the battery may be in the following two different forms according to different structures and functions.

In a first preferred embodiment, the anode includes the anode current collector and the anode active substance carried on the anode current collector.

The anode current collector, serving as a carrier for conducting and collecting electrons, does not participate in an electrochemical reaction. The material of the anode current collector is selected from at least one of metals Ni, Cu, Ag, Pb, Mn, Sn, Fe, and Al, or any of the foregoing metals that are passivated, or elemental silicon, or a carbon-based material. The carbon-based material includes a graphite material, for example, foil pressed by commercial graphite, where a weight percentage of graphite is in the range of 90-100%. The material of the anode current collector may alternatively be selected from stainless steel or passivated stainless steel. The stainless steel includes, but is not limited to, a stainless steel mesh and stainless steel foil. Similarly, the model of the stainless steel may be 300 series stainless steel, for example, stainless steel 304, or stainless steel 316, or stainless steel 316L.

Preferably, the anode current collector is brass foil.

The anode active substance exists in flake or powder form.

When a anode active substance in flake form is used, the anode active substance and the anode current collector form a composite layer.

When a anode active substance in powder form is used, the powder of the anode active substance is prepared into slurry, and then the slurry is coated on the anode current collector to prepare the anode. In a specific implementation, when the anode is being prepared, in addition to the powder of the anode active substance, a anode conductive agent and a anode adhesive may further be added according to an actual situation, so as to improve the performance of the anode.

Preferably, the anode active substance is zinc.

In a preferred embodiment, the anode includes brass foil and zinc foil. The brass foil serves as the anode current collector, the zinc foil serves as the anode active substance, and the brass foil and the zinc foil may participate in the reaction at the anode.

In a second preferred embodiment, the anode active substance is directly used as the anode. That is, the anode active substance also serves as the anode current collector.

Regardless of which form described above is used by the anode, the anode active substance may have a dendrite problem in the charging/discharging process of the battery. In the present invention, the lead-containing substance is provided on the surface of the anode active substance and/or in the electrolyte solution, to inhibit dendrite growth on the anode active substance. Preferably, a mass ratio of total lead in the lead-containing substance that is on the surface of the anode active substance and/or in the electrolyte to the battery is not greater than 1000 ppm. Preferably, the lead-containing substance includes at least one of metallic lead, lead sulfate, or lead oxide.

In a preferred implementation, the lead-containing substance only exists on the surface of the anode active substance. More preferably, the lead-containing substance on the surface of the anode active substance includes a lead metal.

It should be noted that "the surface of the anode active substance" in the present invention refers to an interface at a side that is of the anode active substance and that is opposite to the cathode. "The lead-containing substance existing on the surface of the anode active substance" may be understood in two ways: when the lead-containing substance (a simple substance or a compound) is added to the anode active substance in powder form, powder particles of the lead-containing substance are located in the surface of the anode active substance; when the lead-containing substance is added to the anode active substance by means of plating or coating, a plating layer or a coating layer of the lead-containing substance is located on the surface of the anode active substance.

When the lead-containing substance is formed on the surface of the anode active substance, dendrite growth on the anode active substance can be effectively inhibited, and the cycle performance of the battery can be obviously improved.

Preferably, a mass ratio of the lead in the lead-containing substance that is on the surface of the anode active substance to the anode active substance is not greater than 1000 ppm. That is, regardless whether the lead-containing substance is a metallic simple substance or any one or more of compounds thereof, "the lead on the surface of the anode active substance" refers to the total content of the lead contained thereby.

The lead-containing substance may be added to the anode active substance by using a physical method or a chemical method. The physical method includes, but is not limited to, mechanical mixing the lead-containing substance into, mechanical coating or vacuum plating the lead-containing substance into, or magnetron sputtering the lead-containing substance into onto the anode active substance. The chemical method includes, but is not limited to, electrochemically plating the lead-containing substance into on the anode active substance.

In a preferred implementation, the lead-containing substance only exists in the electrolyte solution. More preferably, the lead-containing substance in the electrolyte includes lead ions.

When the lead-containing substance is added to the electrolyte solution, dendrite growth on the anode active substance can also be effectively inhibited. When the lead-containing substance is added to the electrolyte solution, some lead ions enter the electrolyte solution. Although the lead-containing substance is difficult to be dissolved in the electrolyte solution at the beginning, in the charging/discharging process, the lead ions may be slowly dissolved from the lead-containing substance. The lead ions in the electrolyte solution facilitate a dynamics process of deposition-dissolution of the second metal ions on the surface of the anode active substance, can stabilize a deposition process of the second metal ions, and change a crystal face direction of deposition of the second metal ions on the surface of the anode active substance, so as to deposit the second metal ions evenly, and inhibit dendrite growth on the anode active substance.

Preferably, a mass ratio of the lead in the lead-containing substance in the electrolyte solution to the electrolyte solution is not less than 10 ppm. When the added lead-containing substance is completely dissolved in the electrolyte solution, "the lead in the lead-containing substance in the electrolyte solution" refers to the lead ions. When the added lead-containing substance is not completely dissolved in the electrolyte solution, "the lead in the lead-containing substance in the electrolyte solution" refers to a total amount of undissolved lead in the lead-containing substance and lead ions dissolved in the electrolyte solution.

The method for adding the lead-containing substance to the electrolyte solution includes, but is not limited to, directly adding the lead-containing substance to the electrolyte solution or dropping suspensions on a separator. More preferably, these additives are directly added to the electrolyte solution, and then the electrolyte solution is dropped on the separator.

In another preferred implementation, both the surface of the anode active substance and the electrolyte solution includes the lead-containing substance. More preferably, the lead-containing substance on the surface of the anode active substance includes the lead metal and the lead-containing substance in the electrolyte solution includes the lead ions.

Preferably, the mass ratio of the lead in the lead-containing substance in the electrolyte solution to the electrolyte solution is not less than 10 ppm.

Preferably, the battery further includes an additive of a bismuth compound. The bismuth compound is added to the anode, or the electrolyte solution, or both the anode and the electrolyte solution.

Preferably, the bismuth compound is selected from bismuth trioxide and/or bismuth nitrate.

A use amount of the bismuth compound at the anode is preferably as follows:

When only the bismuth trioxide is used, the bismuth trioxide accounts for 0.1-10% of the total weight of the anode.

When only the bismuth nitrate is used, the bismuth nitrate accounts for 0.1-10% of the total weight of the anode.

Certainly, a mixture of the bismuth trioxide and the bismuth nitrate may be used.

A use amount of the bismuth compound in the electrolyte solution is preferably as follows:

When only the bismuth trioxide is used, the bismuth trioxide accounts for 0.01-5% of the total weight of the electrolyte solution.

When only the bismuth nitrate is used, the bismuth nitrate accounts for 0.01-5% of the total weight of the electrolyte solution.

Certainly, a mixture of the bismuth trioxide and the bismuth nitrate may be used.

Certainly, to make the battery performance better, the bismuth compound is added to both the anode and the electrolyte solution.

When the bismuth compound is added to the anode and/or the electrolyte solution, different adding manners may be used according to different forms and structures of the anode and the electrolyte solution, similar to the method for adding the lead-containing substance.

To provide better safety performance, preferably, a separator is further disposed in the electrolyte solution and between the cathode and the anode. The separator may avoid a short circuit caused by a connection between the cathode and the anode due to other accidental factors.

There is no special requirement on the separator, provided that the separator allows the electrolyte solution to pass through and is electrically isolated. All separators used by an organic lithium-ion battery may be applied to the present invention. The separator may also be a microporous ceramic separator or use another material.

The present invention further provides a battery pack. The battery pack includes several batteries described above. Specifically, the battery pack is generated by connecting more than two batteries in series, or in parallel, or both in series and in parallel. A capacity and a voltage of the battery pack may be freely adjusted according to whether the batteries are connected in series and/or parallel. The battery or the battery pack including batteries provided in the present invention may be used as a power supply of a vehicle or a transportation device such as a power train, and may be used as a fixable/an installable power supply such as an uninterruptible power supply.

Implementation 4

The present invention further discloses a battery, including a cathode, a anode, and an electrolyte solution. The cathode includes a cathode active substance and a cathode current collector. The cathode active substance includes a modified lithium manganese oxide material. The electrolyte solution is an aqueous solution.

The cathode active substance participates in a chemical reaction. Specifically, the modified lithium manganese oxide material in the cathode active substance meets a general formula $Li_{1+x}Mn_yM_zO_k$, where M is selected from Pb, $-1 \leq x \leq 0.5$, $1 \leq y \leq 2.5$, $0 < z \leq 0.1$, and $3 \leq k \leq 6$. Specifically, the modified lithium manganese oxide material has been described in Implementation 1, and details are not described herein again.

Specifically, when a cathode material is prepared, in addition to the cathode active substance, usually a cathode conductive agent and a cathode adhesive are added to improve performance of the cathode. The cathode conductive agent and the cathode adhesive have been described in Implementation 3, and details are not described herein again.

The cathode active substance is carried on the cathode current collector. The cathode current collector serves as a carrier for conducting and collecting electrons, and does not participate in an electrochemical reaction. That is, within a working voltage range of the battery, the cathode current collector can stably exist in the electrolyte solution and basically does not have a side reaction, so as to ensure that the battery has stable cycle performance.

The material of the cathode current collector has been described in Implementation 3, and details are not described herein again.

In the following, the battery in Implementation 4 is further described by using a preferred embodiment.

A battery is provided, including a cathode, a anode, and an electrolyte solution. The cathode includes a cathode active substance and a cathode current collector. The cathode active substance includes the modified lithium manganese oxide material described above. The electrolyte solution is an aqueous solution, and further includes first metal ions and second metal ions. In a charging/discharging process of the battery, the first metal ions can be reversibly deintercalated-intercalated at the cathode, the second metal ions can be reduced and deposited as a second metal at the anode, and the second metal can be oxidized and dissolved back to the second metal ions. The first metal ions are lithium ions.

An operating principle of the battery is: When the battery is charged, the modified lithium manganese oxide material of the cathode active substance deintercalates the lithium ions and releases electrons, the electrons reach the anode of the battery through an external circuit, and the second metal ions in the electrolyte solution are reduced at the anode after obtaining the electrons and are deposited at the anode to form a second metal. When the battery is discharged, the second metal at the anode is oxidized, loses electrons, and is converted into the second metal ions to enter the electrolyte solution; the electrons reach the cathode through an external circuit; the cathode active substance receives the electrons and is reduced; and the first metal ions, that is, the lithium ions, in the electrolyte solution are intercalated into the cathode active substance.

The first metal ions, that is, the lithium ions, included in the electrolyte solution can be reversibly deintercalated-intercalated at the cathode during the charging/discharging process. That is, when the battery is charged, the first metal ions, that is, the lithium ions, are deintercalated from the modified lithium manganese oxide material of the cathode active substance and enter the electrolyte solution; when the battery is discharged, the first metal ions, that is, the lithium ions, in the electrolyte solution are intercalated into the modified lithium manganese oxide material of the cathode active substance.

Preferably, the second metal ions are zinc ions.

Anions in the electrolyte solution may be any anions that basically do not affect reactions at the cathode and the anode and that are obtained by dissolving an electrolyte in a solvent. For example, the anions may be sulfate ions, chlorine ions, acetate ions, nitrate ions, phosphate ions, formate ions, alkylsulfonate ions, or a mixture thereof.

Concentrations of various ions in the electrolyte solution may be changed and adjusted according to different electrolytes, different solvents, different application fields of the battery, or the like.

Preferably, in the electrolyte solution, the concentration of the first metal ions, that is, the lithium ions, is 0.1-10 mol/L.

Preferably, in the electrolyte solution, the concentration of the second metal ions is 0.5-15 mol/L.

Preferably, in the electrolyte solution, the concentration of the anions is 0.5-12 mol/L.

To better optimize the battery performance, the pH of the electrolyte solution is in the range of 2-8. The pH range may be adjusted by using a buffer. Excessively high pH of the electrolyte solution may affect the concentration of the zinc ions in the electrolyte solution, and excessively low pH of the electrolyte solution may accelerate corrosion of an electrode material. However, keeping the pH of the electrolyte solution in the range of 2-8 can not only effectively ensure the concentrations of the metal ions in the electrolyte solution but also avoid electrode corrosion.

The anode may be in the following three different forms according to different structures and functions thereof.

The anode only includes a anode current collector. The anode current collector is only serves as a carrier for conducting and collecting the electrons, and does not participate in an electrochemical reaction.

For example, the anode current collector is copper foil, a stainless steel mesh, stainless steel foil, or graphite foil.

The anode only includes a anode active substance, and the anode active substance serves as the anode current collector. For example, the second metal ions are zinc ions, and the anode is zinc foil. The zinc foil may participate in a reaction at the anode.

Preferably, the anode includes a anode active substance and a anode current collector. The anode active substance is carried on the anode current collector. The anode active substance is the same as the second metal. If the second metal ions in the electrolyte solution are $Zn^{2+}$ and the second metal is metal Zn, the anode active substance is also correspondingly the metal Zn. More preferably, the anode includes brass foil and zinc foil. The brass foil serves as the anode current collector, the zinc foil corresponds to the anode active substance, and the brass foil and the zinc foil may participate in the reaction at the anode.

The anode active substance exists in flake or powder form.

When the anode active substance is in flake form, the anode active substance and the anode current collector form a composite layer.

When the anode active substance is a powder, the powder of the second metal is prepared into slurry, and then the slurry is coated on the anode current collector to prepare the anode. In a specific implementation, when the anode is being prepared, in addition to the powder of the anode active substance, that is, the second metal, a anode conductive agent and a anode adhesive may further be added according to an actual situation, so as to improve the performance of the anode.

Regardless of which form described above is used by the anode, the anode active substance may have a dendrite problem in the charging/discharging process of the battery. In the present invention, a lead-containing substance is provided on a surface of the anode active substance and/or in the electrolyte solution, to inhibit dendrite growth on the anode active substance.

Specifically, in Implementation 4, the lead-containing substance existing on the surface of the anode active substance and/or in the electrolyte is the same as that in Implementation 3, and details are not described herein again.

To provide better safety performance, preferably, a separator is further disposed in the electrolyte solution and between the cathode and the anode. The separator may avoid a short circuit caused by a connection between the cathode and the anode due to other accidental factors.

There is no special requirement on the separator, provided that the separator allows the electrolyte solution to pass through and is electrically isolated. All separators used by an organic lithium-ion battery may be applied to the present invention. The separator may also be a microporous ceramic separator or use another material.

The modified lithium manganese oxide material provided in the present invention has good compatibility with an aqueous electrolyte solution, and a side reaction at an interface between the modified lithium manganese oxide material and the aqueous electrolyte solution is inhibited. Further, for a battery that uses the modified lithium manganese oxide material as the cathode active substance, cycle performance, self-discharge performance, and float charging performance are obviously improved. Therefore, the battery provided in the present invention has a good commercial application prospect.

The present invention further provides a battery pack. The battery pack includes several batteries described above. Specifically, the battery pack is generated by connecting more than two batteries in series, or in parallel, or both in series and in parallel. A capacity and a voltage of the battery pack may be freely adjusted according to whether the batteries are connected in series and/or parallel. The battery or the battery pack including batteries provided in the present invention may be used as a power supply of a vehicle or a transportation device such as a power locomotive, and may be used as a fixable/an installable power supply such as an uninterruptible power supply.

Implementation 5

The present invention further discloses a battery, including a cathode, a anode, and an electrolyte solution. The cathode includes a composite cathode material and a cathode current collector. The composite cathode material includes a cathode active substance and a coating layer. The cathode active substance includes a lithium ion intercalation/deintercalation compound. The coating layer is metallic lead and/or lead oxide. The electrolyte solution is an aqueous solution.

Specifically, a mass percentage of lead in the metallic lead and/or the lead oxide in the cathode active substance is in the range of 0.001%-10%. The lead oxide includes at least one of lead monoxide, lead dioxide, or lead tetroxide.

The cathode active substance participates in an electrochemical reaction. Specifically, the composite cathode material has been described in Implementation 2, and details are not described herein again.

Specifically, when a cathode material is prepared, in addition to the composite cathode material, usually a cathode conductive agent and a cathode adhesive are added to improve performance of the cathode. The cathode conductive agent and the cathode adhesive have been described in Implementation 3, and details are not described herein again.

The composite cathode material is carried on the cathode current collector. The cathode current collector serves as a carrier for conducting and collecting electrons, and does not participate in an electrochemical reaction. That is, within a working voltage range of the battery, the cathode current collector can stably exist in the electrolyte solution and basically does not have a side reaction, so as to ensure that the battery has stable cycle performance.

The cathode current collector is the same as the cathode current collector in Implementation 3, and details are not described herein again.

In the following, the battery in Implementation 5 is further described by using a preferred embodiment.

A battery is provided, including a cathode, a anode, and an electrolyte solution. The cathode includes a composite cathode material and a cathode current collector. The composite cathode material is described above. The electrolyte solution is an aqueous solution, and further includes first metal ions and second metal ions. In a charging/discharging process of the battery, the first metal ions can be reversibly deintercalated-intercalated at the cathode, the second metal ions can be reduced and deposited as a second metal at the anode, and the second metal can be oxidized and dissolved back to the second metal ions. The first metal ions are lithium ions.

An operating principle of the battery is: When the battery is charged, a lithium ion intercalation/deintercalation compound of the cathode active substance deintercalates the lithium ions and releases electrons, the electrons reach the anode of the battery through an external circuit; and the second metal ions in the electrolyte solution are reduced at the anode after obtaining the electrons and are deposited at the anode to form a second metal. When the battery is discharged, the second metal at the anode is oxidized, loses electrons, and is converted into the second metal ions to enter the electrolyte solution; the electrons reach the cathode through an external circuit; the cathode active substance receives the electrons and is reduced; and the first metal ions, that is, the lithium ions, in the electrolyte solution are intercalated into the cathode active substance.

The first metal ions, that is, the lithium ions, included in the electrolyte solution can be reversibly deintercalated-intercalated at the cathode during the charging/discharging process. That is, when the battery is charged, the first metal ions, that is, the lithium ions, are deintercalated from the lithium ion intercalation/deintercalation compound of the cathode active substance and enter the electrolyte solution; when the battery is discharged, the first metal ions, that is, the lithium ions, in the electrolyte solution are intercalated into the lithium ion intercalation/deintercalation compound of the cathode active substance.

Preferably, the second metal ions are zinc ions.

Anions in the electrolyte solution may be any anions that basically do not affect reactions at the cathode and the anode and that are obtained by dissolving an electrolyte in a solvent. For example, the anions may be sulfate ions, chlorine ions, acetate ions, nitrate ions, phosphate ions, formate ions, alkylsulfonate ions, or a mixture thereof.

Concentrations of various ions in the electrolyte solution may be changed and adjusted according to different electrolytes, different solvents, different application fields of the battery, or the like.

Preferably, in the electrolyte solution, the concentration of the first metal ions, that is, the lithium ions, is 0.1-10 mol/L.

Preferably, in the electrolyte solution, the concentration of the second metal ions is 0.5-15 mol/L.

Preferably, in the electrolyte solution, the concentration of the anions is 0.5-12 mol/L.

To better optimize the battery performance, the pH of the electrolyte solution is in the range of 2-8. The pH range may be adjusted by using a buffer. Excessively high pH of the electrolyte solution may affect the concentration of the zinc ions in the electrolyte solution, and excessively low pH of the electrolyte solution may accelerate corrosion of an electrode material. However, keeping the pH of the electrolyte solution in the range of 2-8 can not only effectively ensure the concentrations of the metal ions in the electrolyte solution but also avoid electrode corrosion.

The anode is the same as the anode in Implementation 4, and details are not described herein again.

Regardless of which form described above is used by the anode, the anode active substance may have a dendrite problem in the charging/discharging process of the battery. In the present invention, a lead-containing substance is provided on a surface of the anode active substance and/or in the electrolyte solution, to inhibit dendrite growth on the anode active substance.

Specifically, in Implementation 5, the lead-containing substance existing on the surface of the anode active substance and/or in the electrolyte is the same as that in Implementation 3, and details are not described herein again.

To provide better safety performance, preferably, a separator is further disposed in the electrolyte solution and between the cathode and the anode. The separator may avoid a short circuit caused by a connection between the cathode and the anode due to other accidental factors.

There is no special requirement on the separator, provided that the separator allows the electrolyte solution to pass through and is electrically isolated. All separators used by an organic lithium-ion battery may be applied to the present invention. The separator may also be a microporous ceramic separator or use another material.

The composite cathode material provided in the present invention has good compatibility with an aqueous electrolyte solution, and a side reaction at an interface between the composite cathode material and the aqueous electrolyte solution is inhibited. Further, for a battery that uses the composite cathode material as the cathode active substance, cycle performance, self-discharge performance, and float charging performance are obviously improved. Therefore, the battery provided in the present invention has a good commercial application prospect.

The present invention further provides a battery pack. The battery pack includes several batteries described above. Specifically, the battery pack is generated by connecting more than two batteries in series, or in parallel, or both in series and in parallel. A capacity and a voltage of the battery pack may be freely adjusted according to whether the batteries are connected in series and/or parallel. The battery or the battery pack including batteries provided in the present invention may be used as a power supply of a vehicle or transportation means such as a train, and may be used as a fixable/an installable power supply such as an uninterruptible power supply.

The present invention is further described below with reference to embodiments.

Embodiment 1-1

Preparing a cathode: lithium manganese oxide LMO, a conductive agent graphite KS15, and adhesives styrene-butadiene rubber (SBR) and sodium carboxymethyl cellulose (CMC) are mixed in water according to a mass ratio of LMO:CMC:SBR:graphite=86.5:1:2.5: 10, to form even cathode slurry. A cathode current collector is a composite material of a PE conductive film and nickel-plated carbon steel. The cathode slurry is coated on the cathode current collector to form an active substance layer that is subsequently compressed, to prepare a cathode sheet. The thickness of the cathode sheet is 0.4 mm. The surface density of the cathode active substance is 750 g/m$^2$.

A anode includes zinc foil having a thickness of 55 μm. A surface of the zinc foil has a lead plated layer, and a mass ratio of the lead plated layer to the zinc foil is 700 ppm.

An electrolyte solution is a mixed aqueous solution of 2 mol/L zinc sulfate and 1 mol/L lithium sulfate.

A separator is an AGM glass fiber, and sizes of the separator and the anode are equivalent to the size of the cathode.

Five cathodes and six anodes are arranged in a staggered manner. The cathodes are separated from the anodes by using separators. The electrolyte solution is injected to obtain a saturated solution. A theoretical capacity of an assembled battery is approximately 5 Ah, and the battery is denoted as A1.

Embodiment 1-2

Different from Embodiment 1-1, in this embodiment, the mass ratio of the lead plated layer on the surface of the zinc foil to the zinc foil is 300 ppm. The other parts are the same as those in Embodiment 1-1. The battery is denoted as A2.

Embodiment 1-3

Different from Embodiment 1-1, in this embodiment, the mass ratio of the lead plated layer on the surface of the zinc foil to the zinc foil is 1000 ppm. The other parts are the same as those in Embodiment 1-1. The battery is denoted as A3.

Embodiment 1-4

Different from Embodiment 1-1, in this embodiment, the mass ratio of the lead plated layer on the surface of the zinc foil to the zinc foil is 100 ppm. The other parts are the same as those in Embodiment 1-1. The battery is denoted as A4.

Embodiment 1-5

Particular amounts of zinc sulfate and lithium sulfate are weighed and dissolved in deionized water, and then lead sulfate is added. Concentrations of the zinc sulfate and the lithium sulfate in the electrolyte solution are 2 mol/L and 1 mol/L respectively. A concentration of the lead sulfate in the electrolyte solution is 450 ppm.

A working electrode including the prepared electrolyte solution and 2.5 cm$^2$ zinc foil, a foamed nickel electrode, and a saturated calomel reference electrode compose a three-electrode system battery, which is denoted as A5.

Embodiment 1-6

Different from Embodiment 1-5, in this embodiment, the concentration of the added lead sulfate in the electrolyte solution is 150 ppm. The other parts are the same as those in Embodiment 1-5. The battery is denoted as A6.

Embodiment 1-7

Different from Embodiment 1-5, in this embodiment, the concentration of the added lead sulfate in the electrolyte solution is 75 ppm. The other parts are the same as those in Embodiment 1-5. The battery is denoted as A7.

Embodiment 1-8

Different from Embodiment 1-5, in this embodiment, the concentration of the added lead sulfate in the electrolyte solution is 10 ppm. The other parts are the same as those in Embodiment 1-5. The battery is denoted as A8.

Embodiment 1-9

Different from Embodiment 1-5, in this embodiment, the concentration of the added lead sulfate in the electrolyte solution is 1000 ppm. The other parts are the same as those in Embodiment 1-5. The battery is denoted as A9.

Comparative Example 1-1

Different from Embodiment 1-1, in this comparative example, no lead plated layer is provided on the surface of the anode active substance, that is, the zinc foil, of the battery. The other parts are the same as those in Embodiment 1-1. The battery is denoted as D1.

Comparative Example 1-2

Different from Embodiment 1-1, in this comparative example, the mass ratio of the lead plated layer on the surface of the anode active substance, that is, the zinc foil, of the battery to the zinc foil is 1500 ppm. The other parts are the same as those in Embodiment 1-1. The battery is denoted as D2.

Comparative Example 1-3

Different from Embodiment 1-5, in this comparative example, no lead sulfate is added to the electrolyte solution of the three-electrode system battery. The other parts are the same as those in Embodiment 1-5. The battery is denoted as D3.

Performance Test

Cycle Performance Test

At 25° C., batteries A1-A4 and D1-D2 are cyclically charged and discharged with a constant current of 100 DOD % at a 0.2 C rate, and a voltage range is 1.4-2.1 V.

Table 1 shows capacity-keeping rates of the batteries A1-A4 and D1-D2 after being circulated for 75 times with respect to initial discharge capacities. It can be learned from Table 1 that after the surface of the anode active substance of the battery is plated with lead, the cycle performance of the battery is improved. Especially, when a mass ratio of the lead to the zinc foil is not greater than 1000 ppm, the cycle performance of the battery is greatly improved.

TABLE 1

|  | Battery | | | | | |
| --- | --- | --- | --- | --- | --- | --- |
|  | A1 | A2 | A3 | A4 | D1 | D2 |
| Amount of lead that is plated with/ppm | 700 | 300 | 1000 | 100 | 0 | 1500 |
| Capacity-keeping rate/% | 84 | 79 | 92 | 75 | 16 | 68 |

FIG. 1 is a line graph showing relationships between discharge capacities, internal resistance, and numbers of cycles of the batteries A1 and D1. It can also be learned from FIG. 1 that a cycle life of the battery A1 is significantly improved with respect to the battery D1. When the battery A1 is circulated for 105 times, the discharge capacity-keeping rate is approximately 80%. After D1 is circulated for 50 times, the internal resistance of the battery is obviously increased, and the battery capacity rapidly drops. When D1 is circulated for 75 times, the discharge capacity-keeping rate is only about 16%.

The foregoing results indicate that when the surface of the anode active substance has a lead plated layer, dendrite growth on the anode active substance can be effectively inhibited, so as to reduce the internal resistance of the battery, and improve the cycle life and the discharge capacity of the battery.

Chronoamperometry Test

Under an overvoltage of −120 mV, a chronoamperometry test is performed on the three-electrode system batteries A5-A9 and D3 for one hour.

Figure 2:
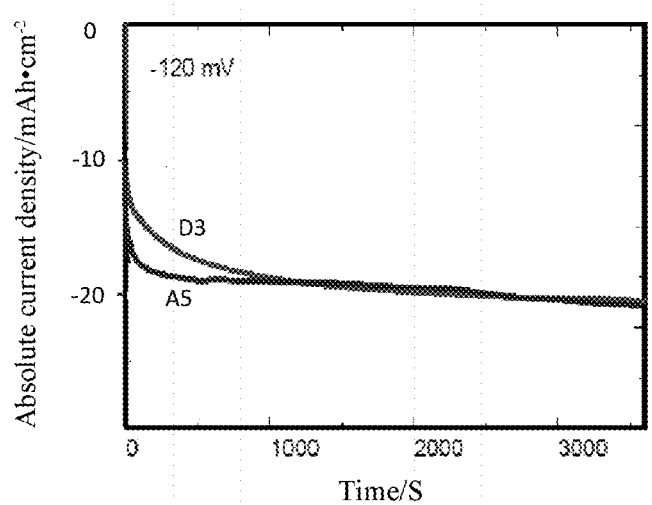
FIG. 2 shows curves of time and absolute current densities at working electrodes of three-electrode system batteries in Embodiment 1-5 and Comparative example 1-3.
Figure 3:
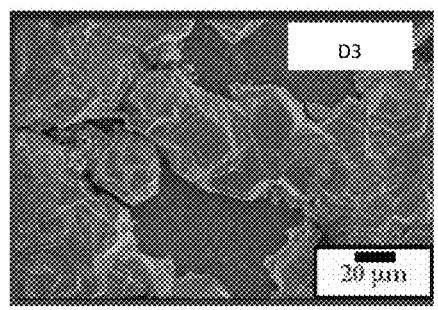
FIG. 3 is a scanning electron microscope (SEM) diagram of the working electrode after the three-electrode system battery in Embodiment 1-5 works for one hour.
Figure 4:
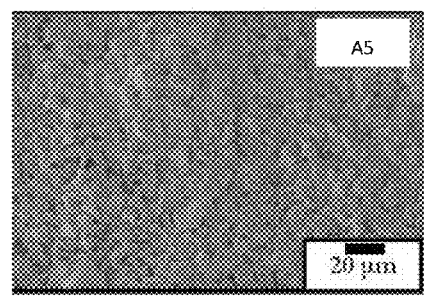
FIG. 4 is an SEM diagram of a working electrode after a three-electrode system battery in Embodiment 1-6 works for one hour.
Figure 5:
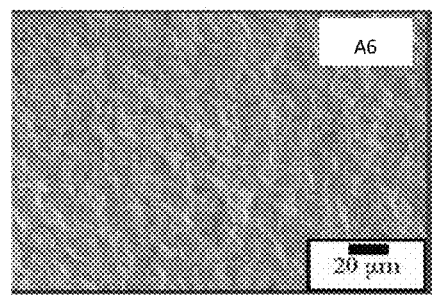
FIG. 5 is an SEM diagram of a working electrode after a three-electrode system battery in Embodiment 1-7 works for one hour.
Figure 6:
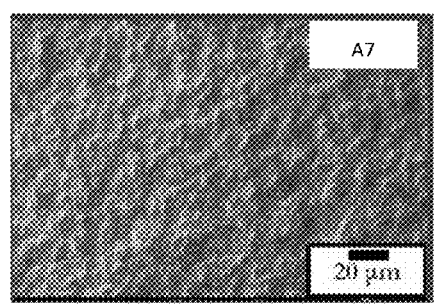
FIG. 6 is an SEM diagram of the working electrode after the three-electrode system battery in Comparative example 1-3 works for one hour.

FIG. 2 shows curves of time and absolute current densities at working electrodes of the three-electrode system batteries A5 and D3. A zinc working electrode serves as a cathode of which the absolute current density is related to a metal deposition amount at a zinc electrode. It can be learned from the figure that after one hour, tested current densities at the zinc electrodes of D3 and A5 are much close. This indicates that within the hour, metal deposition amounts at the zinc electrodes of D3 and A5 are equivalent. However, the current density at the zinc electrode of A5 may be stabilized within 150 s, while the current density at the zinc electrode of D3 tends to be stabilized after approximately 1500 s. This indicates that lead ions can stabilize deposition of zinc ions. Similar phenomena may be found from A6-A9. Provided that lead ions are added to the electrolyte solution, the cathode current density thereof can be stabilized rapidly, indicating that trace lead ions can facilitate deposition of the zinc ions.

SEM Analysis

Under the overvoltage of −120 mV, a chronoamperometry test is performed on the three-electrode system batteries A5-A9 and D3 for one hour. The tested working electrodes are cleaned by using deionized water, and are dried under room temperature. Microstructures of the working electrodes are observed through an SEM.

FIG. 3 to FIG. 6 are SEM diagrams of working electrodes of A5-A7 and D3 after the chronoamperometry test is performed on A5-A7 and D3 for one hour. It can be learned from the figures that when the lead sulfate is added to the electrolyte solution, a deposition layer of the zinc ions at the anode, that is, the zinc electrode, is even, and deposited metal particles are small. However, if the lead sulfate is not added to the electrolyte solution, the deposition layer of the zinc ions is uneven, a part of the zinc electrode has no deposition layer, but the other part of the zinc electrode has a thick deposition layer, and dendrites of large particles obviously exist. This indicates that the lead ions can change a crystal face of deposition of the zinc ions at the zinc electrode, and therefore the deposition layer is distributed more evenly.

In conclusion, when the lead-containing substance exists on the surface of the anode active substance or in the electrolyte solution, dendrite growth on the anode active substance is effectively inhibited, and the cycle performance and the discharge capacity of the battery can be obviously improved.

Embodiment 2-1

A molecular formula of a modified lithium manganese oxide material in this embodiment is $LiMn_2Pb_{0.05}O_4$.

The modified lithium manganese oxide material in this embodiment is prepared by using the following method.

Ingredients of lithium chlorate, manganous-manganic oxide, and lead sulfate are weighed according to a mol ratio of Li:Mn:Pb=1:2:0.05, and are mixed in alcohol. The product obtained after the even mixing is sent to a sintering furnace for heat treatment at 700-850° C. under an air atmosphere for 15-30 hours.

The modified lithium manganese oxide material $LiMn_2Pb_{0.05}O_4$ is obtained and is denoted as a1.

Embodiment 2-2

A molecular formula of a modified lithium manganese oxide material in this embodiment is $LiMn_2Pb_{0.01}O_4$.

The modified lithium manganese oxide material in this embodiment is prepared by using the following method.

Ingredients of lithium chlorate, manganous-manganic oxide, and lead sulfate are weighed according to a mol ratio of Li:Mn:Pb=1:2:0.01, and are mixed in alcohol. The product obtained after the even mixing is sent to the sintering furnace for heat treatment at 700-850° C. under an air atmosphere for 15-30 hours.

The modified lithium manganese oxide material $LiMn_2Pb_{0.01}O_4$ is obtained and is denoted as a2.

Embodiment 2-3

A molecular formula of a modified lithium manganese oxide material in this embodiment is $LiMn_2Pb_{0.005}O_4$.

The modified lithium manganese oxide material in this embodiment is prepared by using the following method.

Ingredients of lithium chlorate, manganous-manganic oxide, and lead sulfate are weighed according to a mol ratio of Li:Mn:Pb=1:2:0.005, and are mixed in alcohol. The product obtained after the even mixing is sent to the sintering furnace for heat treatment at 700-850° C. under an air atmosphere for 15-30 hours.

The modified lithium manganese oxide material $LiMn_2Pb_{0.005}O_4$ is obtained and is denoted as a3.

Embodiment 2-4

A molecular formula of a modified lithium manganese oxide material in this embodiment is $LiMn_2Pb_{0.001}O_4$.

The modified lithium manganese oxide material in this embodiment is prepared by using the following method.

Ingredients of lithium chlorate, manganous-manganic oxide, and lead sulfate are weighed according to a mol ratio of Li:Mn:Pb=1:2:0.001, and are mixed in alcohol. The product obtained after the even mixing is sent to the sintering furnace for heat treatment at 700-850° C. under an air atmosphere, for 15-30 hours.

The modified lithium manganese oxide material $LiMn_2Pb_{0.001}O_4$ is obtained and is denoted as a4.

Comparative Example 2-1

In Comparative example 2-1, the lithium manganese oxide is not modified, and a molecular formula of a lithium manganese oxide material is $LiMn_2O_4$, which is denoted as d1.

Embodiment 2-5

The modified lithium manganese oxide material a1 of the cathode active substance, the conductive agent graphite, and the adhesives CMC and SBR are mixed in water according to a mass ratio of a1:graphite:CMC:SBR=84.5:12:1:2.5, so as to form even cathode slurry. The cathode slurry is coated on graphite foil of the cathode current collector to form an active substance layer. The surface density of the cathode active substance is 20 mg/cm$^2$.

The anode includes the anode active substance, that is, zinc foil having a thickness of 50 μm, and the anode current collector, that is, brass foil having a thickness of 20 μm.

An AGM film serves as the separator.

Certain amounts of zinc sulfate and lithium sulfate are weighed and are dissolved in water, to obtain an electrolyte solution including 2 mol/L zinc sulfate and 1 mol/L lithium sulfate.

The cathode, the anode, and the separator are assembled as an electrochemical cell. The electrochemical cell is enclosed in a housing, then the electrolyte solution is injected, and sealing is performed. Therefore, a 7 mAh battery is assembled, and is denoted as B1.

Embodiment 2-6

In Embodiment 2-6, the cathode active substance uses the modified lithium manganese oxide material a2. Other structures of the battery and the preparing method therefor are the same as those in Embodiment 2-5. A 7 mAh battery is assembled, and is denoted as B2.

Embodiment 2-7

In Embodiment 2-7, the cathode active substance uses the modified lithium manganese oxide material a3. Other structures of the battery and the preparing method therefor are the same as those in Embodiment 2-5. A 7 mAh battery is assembled, and is denoted as B3.

Embodiment 2-8

In Embodiment 2-8, the cathode active substance uses the modified lithium manganese oxide material a4. Other structures of the battery and the preparing method therefor are the same as those in Embodiment 2-5. A 7 mAh battery is assembled, and is denoted as B4.

Comparative Example 2-2

In Comparative example 2-2, the cathode active substance uses the lithium manganese oxide material d1. Other structures of the battery and the preparing method therefor are the same as those in Embodiment 2-5. A 7 mAh battery is assembled, and is denoted as S1.

Performance Test

Cycle Performance Test

A charge-discharge cycle test is performed on the batteries in Embodiment 2-5 to Embodiment 2-8 and Comparative example 2-2 at normal temperature, at 1 C rate, and within a voltage range of 1.4 V-2.1 V.

Table 1 shows capacity-keeping rates of the batteries B2-B4 and S1 after the batteries are separately circulated for 100 times, 200 times, and 300 times at 1 C with respect to initial discharge capacities.

TABLE 1

| Battery | Capacity-keeping rate/% after being circulated for 100 times at 1 C | Capacity-keeping rate/% after being circulated for 200 times at 1 C | Capacity-keeping rate/% after being circulated for 300 times at 1 C |
|---|---|---|---|
| B2 | 91.7 | 88.1 | 84.5 |
| B3 | 92.0 | 89.2 | 85.1 |
| B4 | 92.3 | 90.3 | 85.6 |
| S1 | 90.2 | 85.8 | 81.0 |

It can be learned from Table 1 that after the cathode active substance of the battery uses the lithium manganese oxide that is modified with lead, the cycle performance of the battery can be improved. The capacity-keeping rates of the batteries B1-B4 are only improved by a few percentage points with respect to the battery S1. However, because the capacity-keeping rate of the battery S1 is not low, it is much difficult to further improve the capacity-keeping rates of the batteries B1-B4 on this basis.

Self-Discharge Test

The batteries in Embodiment 2-5 to Embodiment 2-8 and Comparative example 2-2 are charged at a constant current of 0.2 C, and are charged at the constant-voltage after the batteries are charged to 2.1 V. The 0.2 C current is limited until the current is reduced to 0.02 C. The batteries are placed for a day at 60° C., and after the batteries are cooled to room temperature, capacity losses of the batteries are tested. The batteries are placed for seven days at 60° C., and after the batteries are cooled to room temperature, the capacity losses of the batteries are tested.

Table 2 shows capacity losses of the batteries B1-B4 and S1 after the batteries are placed for a day at 60° C., for two days at 60° C., and for three days at 60° C.

TABLE 2

| Battery | Capacity loss/% after being placed for a day at 60° C. | Capacity loss/% after being placed for two days at 60° C. | Capacity loss/% after being placed for three days at 60° C. |
|---|---|---|---|
| B1 | 11.2 | 10.8 | 11.1 |
| B2 | 11.5 | 11.0 | 11.4 |
| B3 | 13.6 | 12.8 | 13.2 |
| B4 | 14.0 | 13.5 | 13.7 |
| S1 | 14.9 | 14.1 | 14.0 |

It can be learned from Table 2 that after the cathode active substance of the battery uses the lithium manganese oxide that is modified with lead, the capacity loss of the battery is obviously reduced. This indicates that the self-discharge performance of the battery is improved.

High-Temperature Float Charging Test

At room temperature, the batteries in Embodiment 2-5 to Embodiment 2-8 and Comparative example 2-2 are charged at a constant current of 0.2 C, and after the batteries are charged to 2.0 V, are float charged at 2.0 V for 168 h (one week) at 60° C., to test float charging currents and float charging capacities of the batteries.

Table 3 shows the float charging currents and the float charging capacities of the batteries B1-B4 and S1 after the batteries are float charged for 168 h at 60° C.

TABLE 3

| Battery | Float charging current/mA | Float charging capacity/mAh |
|---|---|---|
| B1 | 0.045 | 8.8 |
| B2 | 0.047 | 8.8 |
| B3 | 0.042 | 8.7 |
| B4 | 0.059 | 11.7 |
| S1 | 0.07 | 13.5 |

It can be learned from Table 3 that after the cathode active substance of the battery uses the lithium manganese oxide that is modified with lead, the float charging current and the float charging capacity of the battery are reduced by 15-40% and 13-35% respectively. This result further indicates that the self-discharge performance of the battery is improved.

Embodiment 2-9

In Embodiment 2-9, the cathode active substance uses the modified lithium manganese oxide material a4. Other structures of the cathode and the preparing method therefor are the same as those in Embodiment 2-5.

The anode includes the anode active substance, that is, zinc foil having a thickness of 50 µm. A surface of the zinc foil has a lead plated layer, and a mass ratio of the lead plated layer to the zinc foil is 700 ppm.

An AGM film serves as the separator.

Certain amounts of zinc sulfate and lithium sulfate are weighed and are dissolved in water, to obtain an electrolyte solution including 2 mol/L zinc sulfate and 1 mol/L lithium sulfate.

The cathode, the anode, and the separator are assembled as an electrochemical cell. The electrochemical cell is enclosed in a housing, then the electrolyte solution is injected, and sealing is performed. Therefore, a 7 mAh battery is assembled, and is denoted as B5.

Embodiment 2-10

In Embodiment 2-10, the surface of the zinc foil at the anode has a lead plated layer, and the mass ratio of the lead plated layer to the zinc foil is 300 ppm. Other compositions of the battery and the preparing method therefor are the same as those in Embodiment 2-9. A 7 mAh battery is assembled, and is denoted as B6.

Embodiment 2-11

In Embodiment 2-11, the surface of the zinc foil at the anode has a lead plated layer, and the mass ratio of the lead plated layer to the zinc foil is 100 ppm. Other compositions of the battery and the preparing method therefor are the same as those in Embodiment 2-9. A 7 mAh battery is assembled, and is denoted as B7.

Embodiment 2-12

In Embodiment 2-12, the electrolyte solution is added with lead sulfate whose concentration is 150 ppm. Other compositions of the battery and the preparing method therefor are the same as those in Embodiment 2-9. A 7 mAh battery is assembled, and is denoted as B8.

Performance Test

Cycle Performance Test

A charge-discharge cycle test is performed on the batteries B5-B8 in Embodiment 2-9 to Embodiment 2-12 at normal temperature, at 1 C rate, and within a voltage range of 1.4 V-2.1 V. After being circulated for 100 times, the batteries B5-B8 have capacity-keeping rates higher than the capacity-keeping rate of the battery B4. This result indicates that when the lead-containing substance exists on the surface of the anode active substance or in the electrolyte solution, dendrite growth on the anode active substance is effectively inhibited, and the cycle performance of the battery can be further improved.

Embodiment 3-1

In the composite cathode material of this embodiment, the cathode active substance is lithium manganese oxide $LiMn_2O_4$, the coating layer is lead, and the composite cathode material is lead-coated lithium manganese oxide, where a mass percentage of the lead to the lithium manganese oxide is 5%.

The modified lithium manganese oxide material in this embodiment is prepared by using the following method.

Ingredients of lead acetate and lithium manganese oxide are weighed according to a mass ratio of 5:100, and are mixed and stirred in deionized water. A coating material is evenly coated on surfaces of lithium manganese oxide particles of the cathode active substance. The evenly mixed product is dried, and the dried solid product is sintered for 15-30 h at 400-650° C.

Embodiment 3-2

In the composite cathode material of this embodiment, the cathode active substance is lithium manganese oxide $LiMn_2O_4$, the coating layer is lead, and the composite cathode material is lead coated lithium manganese oxide, where a mass percentage of the lead to the lithium manganese oxide is 1%.

The modified lithium manganese oxide material in this embodiment is prepared by using the following method.

Ingredients of lead acetate and lithium manganese oxide are weighed according to a mass ratio of 1:100, and are mixed and stirred in deionized water. A coating material is evenly coated on surfaces of lithium manganese oxide particles of the cathode active substance. The evenly mixed product is dried, and the dried solid product is sintered for 15-30 h at 400-650° C.

Embodiment 3-3

In the composite cathode material of this embodiment, the cathode active substance is lithium manganese oxide $LiMn_2O_4$, the coating layer is lead, and the composite cathode material is lead coated lithium manganese oxide, where a mass percentage of the lead to the lithium manganese oxide is 0.5%.

The modified lithium manganese oxide material in this embodiment is prepared by using the following method.

Ingredients of lead acetate and lithium manganese oxide are weighed according to a mass ratio of 0.5:100, and are mixed and stirred in deionized water. A coating material is evenly coated on surfaces of lithium manganese oxide particles of the cathode active substance. The evenly mixed product is dried, and the dried solid product is sintered for 15-30 h at 400-650° C.

Embodiment 3-4

In the composite cathode material of this embodiment, the cathode active substance is lithium manganese oxide $LiMn_2O_4$, the coating layer is lead, and the composite cathode material is lead coated lithium manganese oxide, where a mass percentage of the lead to the lithium manganese oxide is 0.1%.

The modified lithium manganese oxide material in this embodiment is prepared by using the following method.

Ingredients of lead acetate and lithium manganese oxide are weighed according to a mass ratio of 0.1:100, and are mixed and stirred in deionized water. A coating material is evenly coated on surfaces of lithium manganese oxide particles of the cathode active substance. The evenly mixed product is dried, and the dried solid product is sintered for 15-30 h at 400-650° C.

Comparative Example 3-1

In Comparative example 3-1, the cathode active substance is lithium manganese oxide $LiMn_2O_4$, and the lithium manganese oxide is not coated.

Embodiment 3-5

The composite cathode material in Embodiment 3-1, the conductive agent graphite, and the adhesives CMC and SBR are mixed in water according to a mass ratio of composite cathode material:graphite:CMC:SBR=84.5:12:1:2.5, so as to form even cathode slurry. The cathode slurry is coated on graphite foil of the cathode current collector to form an active substance layer. The surface density of the cathode active substance is 20 mg/cm$^2$.

The anode includes the anode active substance, that is, zinc foil having a thickness of 50 μm, and the anode current collector, that is, brass foil having a thickness of 20 μm.

An AGM film serves as the separator.

Certain amounts of zinc sulfate and lithium sulfate are weighed and are dissolved in water, to obtain an electrolyte solution including 2 mol/L zinc sulfate and 1 mol/L lithium sulfate.

The cathode, the anode, and the separator are assembled as an electrochemical cell. The electrochemical cell is enclosed in a housing, then the electrolyte solution is injected, and sealing is performed. Therefore, a 7 mAh battery is assembled, and is denoted as C1.

Embodiment 3-6

Embodiment 3-6 uses the composite cathode material in Embodiment 3-2. Other structures of the battery and the preparing method therefor are the same as those in Embodiment 3-5. A 7 mAh battery is assembled, and is denoted as C2.

Embodiment 3-7

Embodiment 3-7 uses the composite cathode material in Embodiment 3-3. Other structures of the battery and the preparing method therefor are the same as those in Embodiment 3-5. A 7 mAh battery is assembled, and is denoted as C3.

Embodiment 3-8

Embodiment 3-8 uses the composite cathode material in Embodiment 3-4. Other structures of the battery and the preparing method therefor are the same as those in Embodiment 3-5. A 7 mAh battery is assembled, and is denoted as C4.

Comparative Example 3-2

Comparative example 3-2 uses the composite cathode material in Embodiment 3-1. Other structures of the battery and the preparing method therefor are the same as those in Embodiment 3-5. A 7 mAh battery is assembled, and is denoted as E1.

Performance Test

Cycle Performance Test

A charge-discharge cycle test is performed on the batteries in Embodiment 3-5 to Embodiment 3-8 and Comparative example 3-2 at normal temperature, at 1 C rate, and within a voltage range of 1.4 V-2.1 V.

Table 4 shows capacity-keeping rates of the batteries C1-C4 and E1 after the batteries are separately circulated for 100 times, 200 times, and 300 times at 1 C with respect to initial discharge capacities.

TABLE 4

| Battery | Capacity-keeping rate/% after being circulated for 100 times at 1 C | Capacity-keeping rate/% after being circulated for 200 times at 1 C | Capacity-keeping rate/% after being circulated for 300 times at 1 C |
| --- | --- | --- | --- |
| C1 | 94.0 | 91.3 | 90.5 |
| C2 | 93.6 | 91.0 | 89.7 |
| C3 | 93.8 | 90.8 | 88.4 |
| C4 | 91.6 | 90.3 | 88.4 |
| E1 | 90.2 | 85.8 | 81.0 |

It can be learned from Table 4 that after the cathode of the battery uses the composite cathode material, the cycle performance of the battery is improved.

High-Temperature Float Charging Test

At room temperature, the batteries in Embodiment 3-5 to Embodiment 3-8 and Comparative example 3-2 are charged at a constant current of 0.2 C, and after the batteries are charged to 2.0 V, are float charged at 2.0 V for 168 h (one week) at 60° C., to test float charging currents and float charging capacities of the batteries.

Table 5 shows the float charging currents and the float charging capacities of the batteries C1-C4 and E1 after the batteries are float charged for 168 h at 60° C.

TABLE 5

| Battery | Float charging current/mA | float charging capacity/mAh |
| --- | --- | --- |
| C1 | 0.047 | 9.8 |
| C2 | 0.049 | 9.9 |
| C3 | 0.050 | 10.0 |
| C4 | 0.065 | 13.0 |
| E1 | 0.070 | 13.5 |

It can be learned from Table 5 that after the cathode of the battery uses the composite cathode material, the float charging current and the float charging capacity of the battery are reduced by 7-33% and 4-27% respectively. This result further indicates that the self-discharge performance of the battery is improved.

Embodiment 3-9

Embodiment 3-9 uses the composite cathode material in Embodiment 3-4. Other structures of the cathode and the preparing method therefor are the same as those in Embodiment 3-5.

The anode includes the anode active substance, that is, zinc foil having a thickness of 50 μm. A surface of the zinc foil has a lead plated layer, and a mass ratio of the lead plated layer to the zinc foil is 700 ppm.

An AGM film serves as the separator.

Certain amounts of zinc sulfate and lithium sulfate are weighed and are dissolved in water, to obtain an electrolyte solution including 2 mol/L zinc sulfate and 1 mol/L lithium sulfate.

The cathode, the anode, and the separator are assembled as an electrochemical cell. The electrochemical cell is enclosed in a housing, then the electrolyte solution is injected, and sealing is performed. Therefore, a 7 mAh battery is assembled, and is denoted as C5.

Embodiment 3-10

In Embodiment 3-10, the surface of the zinc foil at the anode has a lead plated layer, and the mass ratio of the lead plated layer to the zinc foil is 300 ppm. Other compositions of the battery and the preparing method therefor are the same as those in Embodiment 3-9. A 7 mAh battery is assembled, and is denoted as C6.

Embodiment 3-11

In Embodiment 3-11, the surface of the zinc foil at the anode has a lead plated layer, and the mass ratio of the lead plated layer to the zinc foil is 100 ppm. Other compositions of the battery and the preparing method therefor are the same as those in Embodiment 3-9. A 7 mAh battery is assembled, and is denoted as C7.

Embodiment 3-12

In Embodiment 3-12, the electrolyte solution is added with lead sulfate whose concentration is 150 ppm. Other compositions of the battery and the preparing method therefor are the same as those in Embodiment 3-9. A 7 mAh battery is assembled, and is denoted as C8.

Embodiment 3-13

In the composite cathode material of this embodiment, the cathode active substance is lithium manganese oxide $LiMn_2O_4$, the coating layer is lead, and the composite cathode material is lithium manganese oxide coated with lead monoxide, where a mass percentage of lead in the lead monoxide to the lithium manganese oxide is 0.1%.

The modified lithium manganese oxide material in this embodiment is prepared by using the following method.

Ingredients of the lead monoxide and the lithium manganese oxide are weighed according to a mass ratio of 0.1:100, and are mixed and stirred in deionized water. A coating material is evenly coated on surfaces of lithium manganese oxide particles of the cathode active substance. The evenly mixed product is dried, and the dried solid product is sintered for 15-30 h at 400-650°.

The prepared composite cathode material, the conductive agent graphite, and the adhesives CMC and SBR are mixed in water according to a mass ratio of composite cathode material:graphite:CMC:SBR=84.5:12:1:2.5, so as to form even cathode slurry. The cathode slurry is coated on graphite foil of the cathode current collector to form an active substance layer. The surface density of the cathode active substance is 20 mg/cm$^2$.

The anode includes the anode active substance, that is, zinc foil having a thickness of 50 μm, and the anode current collector, that is, brass foil having a thickness of 20 μm.

An AGM film serves as the separator.

Certain amounts of zinc sulfate and lithium sulfate are weighed and are dissolved in water, to obtain an electrolyte solution including 2 mol/L zinc sulfate and 1 mol/L lithium sulfate.

The cathode, the anode, and the separator are assembled as an electrochemical cell. The electrochemical cell is enclosed in a housing, then the electrolyte solution is injected, and sealing is performed. Therefore, a 7 mAh battery is assembled, and is denoted as C9.

Performance Test

Cycle Performance Test

A charge-discharge cycle test is performed on the batteries C5-C9 in Embodiment 3-9 to Embodiment 3-13 at normal temperature, at 1 C rate, and within a voltage range of 1.4 V-2.1 V.

After being circulated for 100 times, the batteries C5-C8 have capacity-keeping rates higher than the capacity-keeping rate of the battery C4. This result indicates that when the lead-containing substance exists on the surface of the anode active substance or in the electrolyte solution, dendrite growth on the anode active substance is effectively inhibited, and the cycle performance of the battery can be further improved.

After being circulated for 100 times, the capacity-keeping rate of the battery C9 is slightly lower than the capacity-keeping rate of the battery C4, and is higher than the capacity-keeping rate of the battery E1. This result indicates that the cathode of the battery uses the cathode material, that is, the lithium manganese oxide coated with the lead monoxide, and the cycle performance of the battery is also improved.

Although the inventor has made detailed descriptions and examples to the technical solutions of the present invention, it should be understood that a person skilled in the art can obviously modify and/or change the foregoing embodiments or use equivalent alternative solutions, without departing from the essence of the spirit of the present invention. Terms in the present invention are used to describe and understand the technical solutions of the present invention, and cannot constitute a limit to the present invention.

What is claimed is:

1. A battery comprising a cathode having a composite cathode material and a cathode current collector, an anode having an anode active substance and an anode current collector, and an electrolyte solution having first and second metal ions, further comprising:

the composite cathode material comprising a coating layer and a cathode active substance;

the coating layer comprising lead having a mass ratio of lead no greater than 1000 ppm; and the cathode active substance comprises a modified lithium manganese oxide material having a general formula $Li_{1+x}Mn_yPb_zO_k$, wherein $-1<x\leq0.5$, $1\leq y\leq2.5$, $0<z\leq0.1$, and $3\leq k\leq6$; and wherein the first metal ions is selected from Lithium, Sodium, and Magnesium, and are reduced and deposited as a first metal at the anode, and the first metal is oxidized and dissolved back to the first metal ions, in a charging/discharging process; and wherein the second metal ions is Zinc, and are reversibly deintercalated-intercalated at the cathode in the charging/discharging process.

2. A battery pack, comprising several batteries according to claim 1.

3. An uninterruptible power supply, comprising the battery according to claim 1.

* * * * *